United States Patent [19]

Yonezawa et al.

[11] Patent Number: 4,583,631
[45] Date of Patent: Apr. 22, 1986

[54] APPARATUS FOR POSITIONING AND CLAMPING WORK CLAMP PALLET FOR MACHINE TOOLS

[75] Inventors: Keitaro Yonezawa; Sohei Yamada, both of Itamishi, Japan

[73] Assignee: Aioi Keiki K.K., Hyogoken, Japan

[21] Appl. No.: 725,165

[22] Filed: Apr. 23, 1985

Related U.S. Application Data

[63] Continuation of Ser. No. 397,167, Jul. 12, 1982, abandoned.

[30] Foreign Application Priority Data

Aug. 4, 1981 [JP] Japan .......................... 56-116643[U]

[51] Int. Cl.⁴ .............................................. B65G 47/06
[52] U.S. Cl. ................................. 198/345; 198/465.1; 269/30
[58] Field of Search ............... 198/339, 345, 472, 648, 198/694; 29/33 P, 563, 568; 269/25, 30, 58; 414/749, 750

[56] References Cited

U.S. PATENT DOCUMENTS

| | | | |
|---|---|---|---|
| 2,667,799 | 2/1954 | Rzepela | 81/17 |
| 2,986,075 | 5/1961 | Ranney | 90/59 |
| 3,572,216 | 3/1971 | Seesody | 92/33 |
| 3,658,315 | 4/1972 | Boucherie | 198/694 |
| 3,788,632 | 1/1974 | Lukas | 269/20 |
| 3,825,245 | 7/1974 | Osburn et al. | 198/472 |
| 3,899,162 | 8/1975 | Fischer | 269/25 |
| 3,948,502 | 4/1976 | Waller et al. | 269/27 |
| 4,014,428 | 3/1977 | Ossbahr | 198/345 |
| 4,058,885 | 11/1977 | Bergman | 29/559 |
| 4,090,287 | 5/1978 | Selander | 29/568 |
| 4,174,828 | 11/1979 | Bergman | 269/34 |
| 4,217,978 | 8/1980 | Stalker | 198/345 |
| 4,239,445 | 12/1980 | Ozawa | 198/345 |
| 4,257,513 | 3/1981 | Siarto | 198/345 |
| 4,275,983 | 6/1981 | Bergman | 198/345 |
| 4,286,778 | 9/1981 | Follmeyer | 269/91 |
| 4,312,110 | 1/1982 | Averyanov et al. | 198/472 |
| 4,373,840 | 2/1983 | Miller, Jr. | 198/339 |
| 4,461,215 | 7/1984 | Sims | 104/1 R |

FOREIGN PATENT DOCUMENTS

| | | | |
|---|---|---|---|
| 2421644 | 4/1974 | Fed. Rep. of Germany . | |
| 3111706 | 1/1982 | Fed. Rep. of Germany | 198/472 |
| WO79/00156 | 5/1979 | Int'l Pat. Institute . | |
| 17580 | 2/1979 | Japan . | |
| 54-17580 | 2/1979 | Japan | 269/20 |
| 163854 | 12/1981 | Japan . | |
| 626933 | 4/1978 | U.S.S.R. . | |

Primary Examiner—Joseph E. Valenza
Assistant Examiner—Daniel R. Alexander
Attorney, Agent, or Firm—Bacon & Thomas

[57] ABSTRACT

An apparatus for positioning and clamping a transferrable work-clamp pallet on the movable table of a machine tool of vertical or horizontal type. The pallet clamping device is composed of a bed plate on the movable table of the machine tool having transfer rails, guide rails, pallet supporting blocks, positioning devices and clamping devices. The work-clamp pallet is transferred onto the bed plate by its castors rolling on the transfer rails and guided by the guide rails. After high-precision positioning by the positioning devices, the pallet is clamped onto the supporting blocks. Devices are also provided for confirming proper positioning and clamping of the work-clamp pallet and for blowing off chips deposited on the supporting blocks.

9 Claims, 29 Drawing Figures

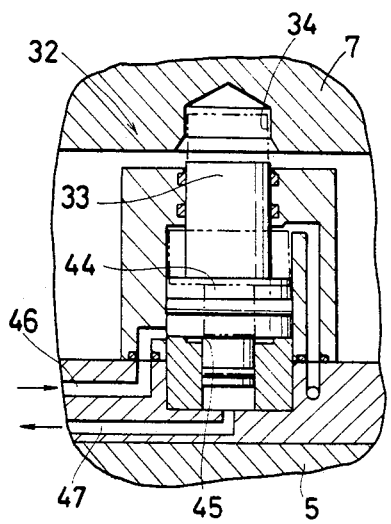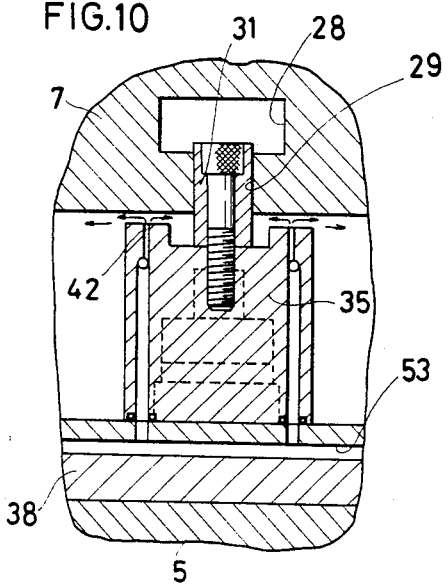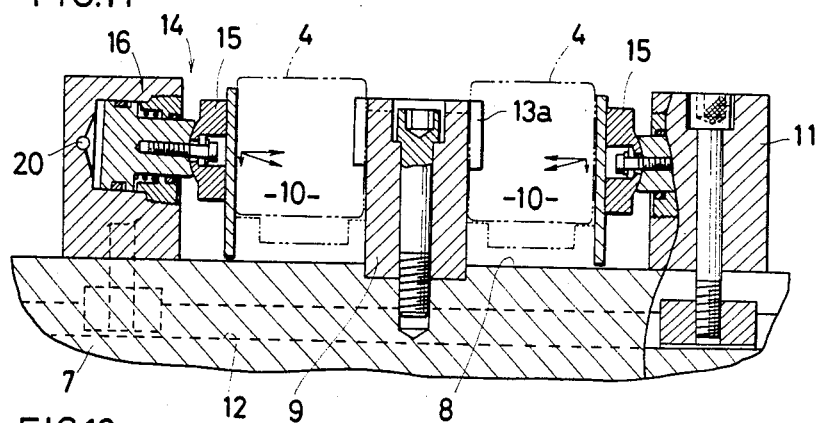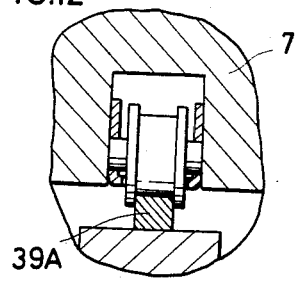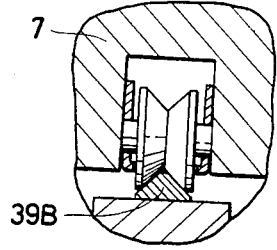

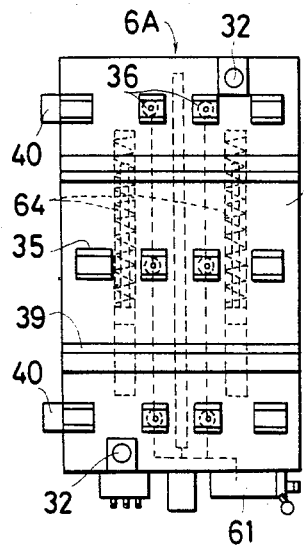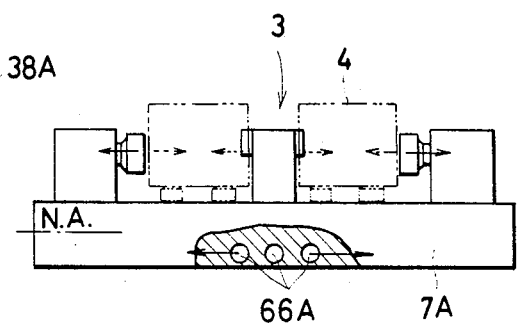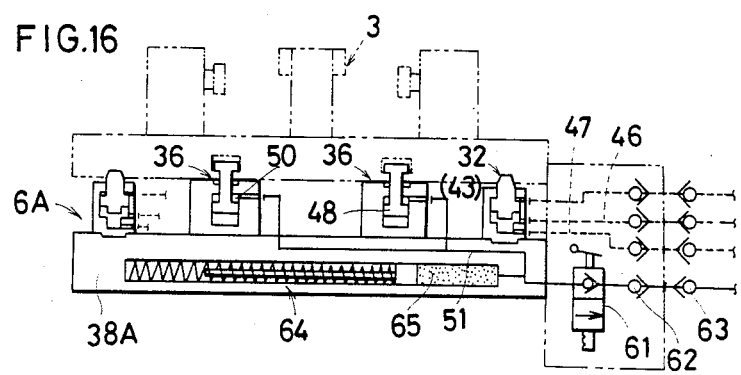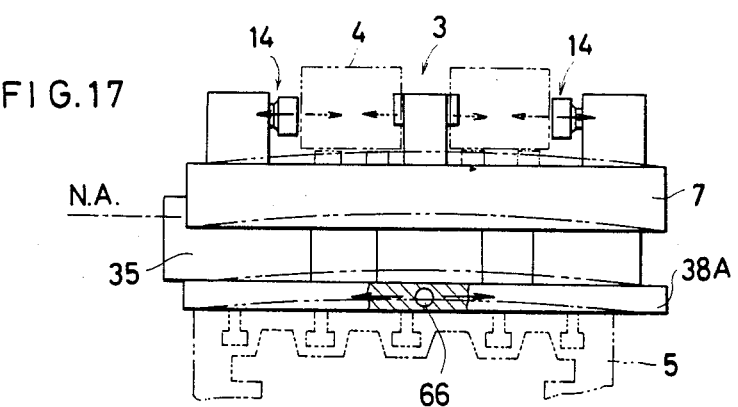

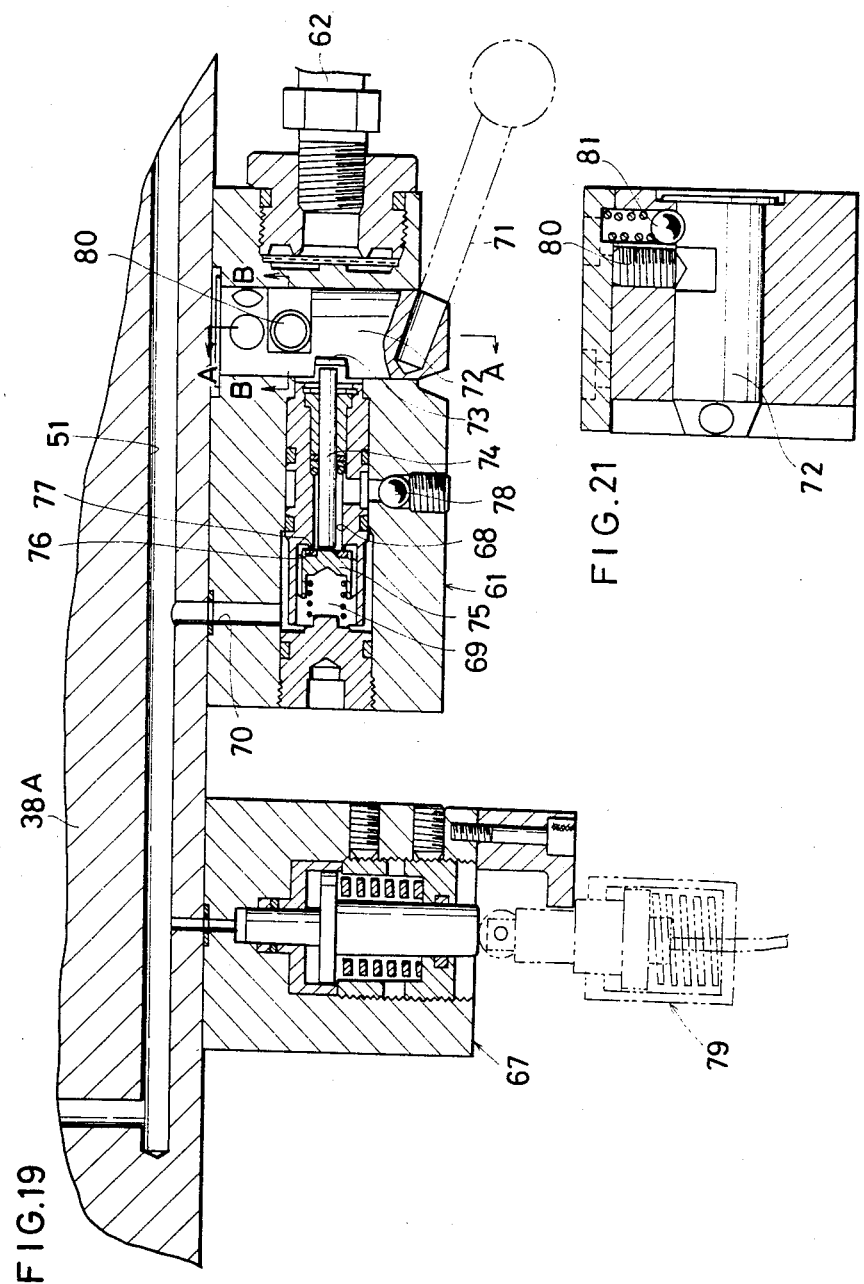

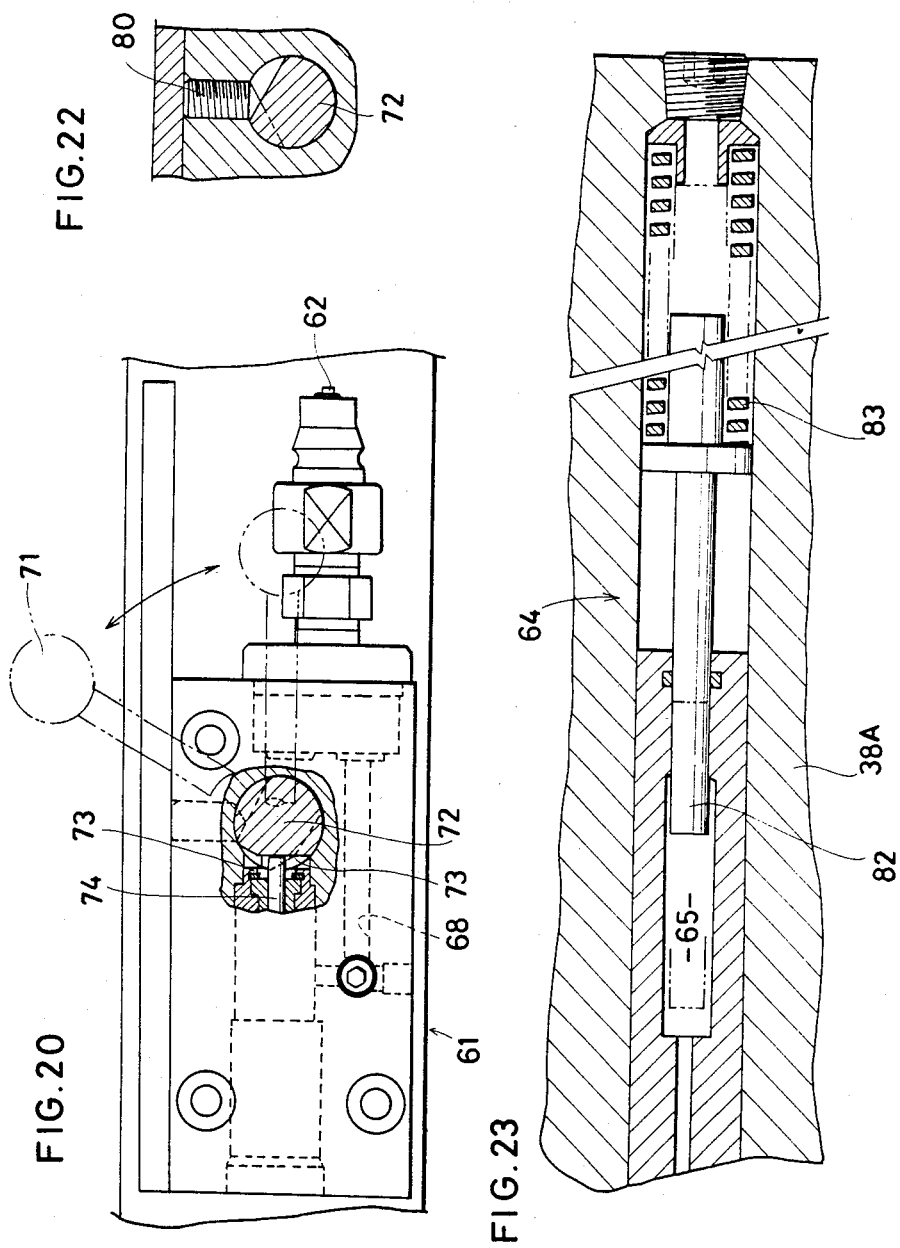

APPARATUS FOR POSITIONING AND CLAMPING WORK CLAMP PALLET FOR MACHINE TOOLS

This application is a continuation of application Ser. No. 397,167, filed July 12, 1982, now abandoned.

BACKGROUND OF THE INVENTION

1. Field of the Invention

The present invention relates to an apparatus for positioning and clamping a work holding pallet on a work table of a machine tool.

When a large number of relatively small work pieces are arranged on a work table of a numerically controlled (NC) machine tool for machining, substantial effort and care are required to precisely position them and subsequently clamped them to the work table.

Although great improvement of the machine's performance has been achieved, much less improvement has been shown in automating the work-changing steps.

Hence, despite the high machining performance, the net working ratio is not more than 30~40% even for the latest models of automated machine tools.

The significance of improving this area is now being recognized and work-changing systems using work-clamp pallets are now being put to practical use. These systems are designed to increase the speed and the efficiency of the work-changing operation so as to sizably improve the overall working efficiency and productivity of the machine tools through reduction of the downtime required to change the workpieces.

The basic idea of these systems is to position and clamp the workpieces on a work-clamp pallet outside the work table of the machine tool, and transfer the work-clamp pallet (with a large number of workpieces on it) onto the work table in exchange for the finished one, i.e. a work-clamp pallet with finished workpieces to thus change the workpieces quickly and efficiently.

The present invention relates to an apparatus for positioning and clamping such workpiece holding pallets on a work table of the machine tool.

2. Description of the Prior Art

One of the latest prior art disclosures concerning an apparatus for positioning and clamping a work-clamp pallet for machine tools is U.S. Pat. No. 4,179,106 titled "Apparatus for Locating and Clamping a Work Member Supporting Fixture".

In the locating and clamping apparatus 110 of the prior art (shown in FIGS. 28 and 29) an auxiliary table 101 formed as the work table of a machine tool itself or fixedly secured to the work table 100 is provided with a transfer means 102 of the air film type, a centering device 103, a plurality of positioning devices 104 and clamping devices (not shown). A work member supporting fixture 105 is transferred onto this auxiliary table 101 to be located and clamped thereon.

The abovementioned transfer 102 consists of a large number of compressed air outlets in the topside of the auxiliary table 101, each provided with a valve ball for opening/closing thereof, which are opened when the work member supporting fixture 105 is placed thereon to form an air film under the supporting fixture.

The locating means comprises a centering device 103 (consisting of a pin projecting upwardly from the auxiliary table 101), and a plurality of the positioning devices 104 each consisting of a hydraulic cylinder extendable from the surface. The clamping devices are hydraulic clamping devices carried in T-sectioned grooves 106 with their positions freely adjustable along the edges of the work member supporting fixture 105.

The locating and clamping apparatus 110 described above is primarily for large-sized work member supporting fixtures 105. More particularly, this apparatus is used for work member supporting fixtures 105 mainly for the horizontal type machine tools having a low work-exchange frequency and is known to have the following defects or shortcomings:

(1) As is apparent from the fact that its transfer device 102 is of the air film type, the topside 107 of the auxiliary table 101 is used for transferring the supporting fixture 105 thereon while at the same time it is the plane on which the same is located and clamped, hence there is an increased risk of chips being caught between the topside of the auxiliary table 101 and the bottom of the work member supporting fixture 105. This may result in the work member supporting fixture 105 being improperly clamped, increasing the work positioning error with respect to the table 100;

(2) The pin of the centering device 103 projects above the topside of the auxiliary table 101, thus interfering with sideway transfer of the work member supporting fixture 105 onto the auxiliary table 101.

Moreover, while the centering pin is provided for centering of the work member suporting fixture 105, the fixture 105 is free to turn when it floats on the air film, this interfering with precise and efficient positioning thereof;

(3) The clamping devices are made to clamp the work member supporting fixture 105 along its edges, hence the T-sectioned grooves 106 in the topside of the auxiliary table 101 are indispensable. This requires the auxiliary table 101 to be thick and heavy enough to allow for the depth of the T-sectioned grooves 106. This is a fatal defect for the movable table 100 of an NC machine tool or the like which is required to be quickly shiftable with a high precision; and, (4) The transfer device 102 of the air film type is high in compressed air consumption, hence increasing its energy cost.

The consumption of compressed air is bound to be increased remarkably especially when this type of transfer device 102 is applied to the auxiliary table 106 with the T-sectioned grooves in the topside thereof.

SUMMARY OF THE INVENTION

A prime object of the present invention is to eliminate all the defects of the prior art described above.

A first object of the present invention is to improve the machining precision of workpieces by precisely positioning and clamping a work-clamp pallet with workpieces clamped thereon on a machine tool's work table.

A work-clamp pallet is placed on and clamped to a plurality of pallet supporting blocks arranged on a bed plate of the device of the present invention so as to minimize the possibility of machining chips being caught between the supporting blocks and the work-clamp pallet.

A second object of the present invention is to enable quick positioning and clamping of the work-clamp pallet on the device to improve the machine tool's working efficiency.

The work-clamp pallet is provided with castor-type transfer means, so that the work-clamp pallet can easily be moved to and from the device by rolling on rails provided on the bed plate. A guide rail may also be provided for guiding the moving work-clamp pallet.

It is thereby possible to stop the work-clamp pallet transferred onto the pallet-setting device with a fixed stop or the like and immediately thereafter position it quickly with a high precision by means of clamping devices.

A third object of the present invention is to minimize the gross weight of the pallet clamping device carried on the movable work table of a machine tool to improve the machine tool's high machining speed and precision features, as well as to reduce the manufacturing cost of the device.

The bed plate of the pallet-clamping device is made as thin as possible and the transfer rails, supporting blocks, positioning devices and clamping devices are all made with minimum heights.

An additional object of the present invention is to improve the workpiece machining precision by providing a means for generation of inverse bending moment for cancelling or off-setting the bending moment caused in the work-clamp pallet by the clamping force of the work-clamping device of the pallet.

A further object of the present invention is to allow the use of the pallet clamping device with hydraulic hoses detached therefrom by making it detachable from the hydraulic pressure source and to provide means to keep its clamping devices supplied with a required level of hydraulic pressure.

The present invention relates to an apparatus for positioning and clamping a work-clamp pallet, wherein the work-clamp pallet is to be transferred to and from the work table of a machine tool with a plurality of workpieces clamped thereon and is composed of a base block, a plurality of work-clamping devices provided thereon and a set of castor-type transfer means provided in the underside thereof. The base block has its topside or each of its sides constituting a work-clamping face; has a longitudinal transfer guide slot provided on the underside thereof; has longitudinal as well as lateral positioning means provided at a plurality of points off the transfer guide face; and has clamping means also at a plurality of points off the transfer guide face. A plurality of the workpiece-clamping devices are arranged in pairs on the work-clamping face of the base block, and a set of castor-type transfer means has individual castors arranged longitudinally as well as laterally on the underside of the base block such that they are shiftable between a lower projecting rolling position and an upper retracted stopping position.

The pallet clamping device for positioning and clamping the work-clamp pallet on the work table of the machine tool is composed of a bed plate having transfer rails, guide rails, supporting blocks, positioning devices and clamping devices mounted thereon. The bed plate is attached to a movable work table of the machine tool so as to be laterally movable therewith.

The transfer rails are attached to and raised above the topside of the bed plate in at least two lines to provide means on which the castor-type transfer means may travel.

A plurality of pallet supporting blocks are fixedly secured to the topside of the base plate at at least four points, the topsides of the blocks constituting a horizontal reference plane above the topside of the base plate on which the work-clamp pallet is supported.

Guide rails are attached to the pallet supporting blocks with their topsides raised above the horizontal reference plane so as to be in sliding contact with a transfer guide face of the work-clamp pallet for guiding the pallet to ensure against lateral shifting.

A plurality of locating or positioning devices may be provided in the bed plate to engage corresponding positioning means in the work-clamp pallet for longitudinal as well as lateral positioning thereof.

The clamping devices on the bed plate have clamping arms shiftable between an unclamping position and a clamping position. When the arm is in the unclamping position, the work-clamp pallet is released to allow it to move longitudinally and when it is in the clamping position, the work-clamp pallet is clamped onto the pallet supporting blocks.

BRIEF DESCRIPTION OF THE DRAWINGS

FIG. 9 is a partial vertical sectional front view of a positioning device;

FIG. 10 is a partial vertical sectional front view of a supporting block and guide rail;

FIG. 11 is a partial vertical sectional side view of the clamping devices on the work-clamp pallet;

FIGS. 12 and 13 are partial vertical sectional front views of alternative embodiments of the castor transfer means;

FIG. 15 is a plan view of a second embodiment of the pallet clamping device;

FIG. 16 is a partial schematic diagram of the pneumatic-hydraulic system chart of the pallet clamping device shown in FIG. 15;

FIG. 17 is a partial side view of the pallet clamping device and the work-clamp pallet according to the embodiment shown in FIG. 15;

FIG. 18 is a partly broken away side view of an alternative embodiment of the work-clamp pallet;

FIG. 19 is a partial horizontal sectional plan view of a shut-off valve and an actuator for a hydraulic pressure detector according to the embodiment of FIG. 15;

FIG. 20 is a partial side view of the shut-off valve shown in FIG. 19;

FIG. 21 is a sectional view taken along the line A—A in FIG. 19;

FIG. 22 is a sectional view taken along the line B—B in FIG. 19;

FIG. 23 is a partial horizontal sectional plan view of a spring-type hydraulic accumulator;

FIGS. 1~13, describe a principal embodiment of the present invention.

As shown in FIGS. 1 and 2, a rotary pallet-changing table 2 for changing work-clamp pallets 3 is placed in front of a work table of a vertical machine tool 1. After setting and clamping workpieces 4 on the pallet 3 at a work-changing station X, a rotary bed 2a of the pallet-changing table 2 is turned 180° on carrying castors 2b to shift the work-clamp pallet 3 to a pallet changing station Y. From there, the pallet 3 is transferred on transfer rails 39A and 39 onto the work table 5.

The apparatus for positioning and clamping a work-clamp pallet claimed in the present application is for positioning and clamping in place the work-clamp pallet 3 transferred onto the work table 5 of the machine tool 1 and consists of pallet clamping device 6.

Figure 1:
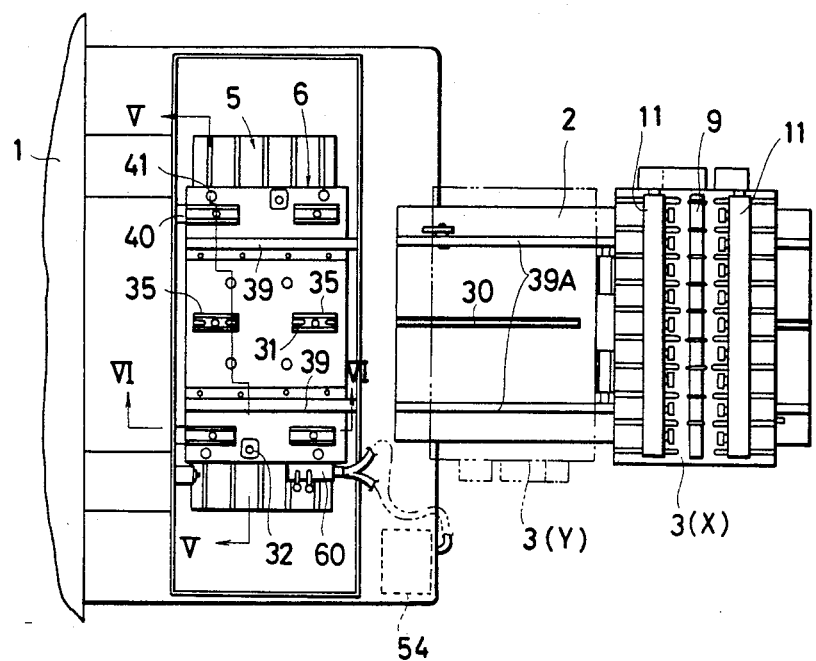
FIG. 1 is a plan view of the work table and pallet-changing table of a machine tool.
Figure 2:
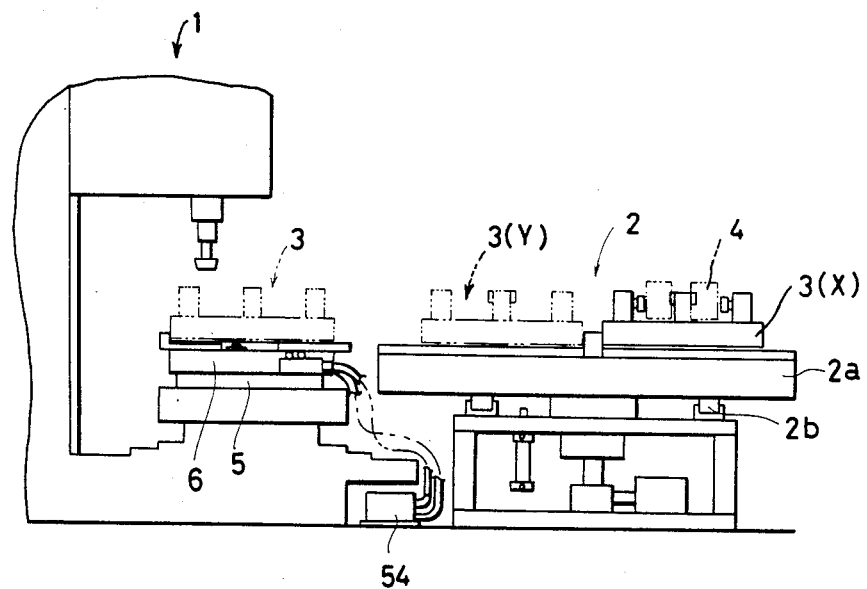
FIG. 2 is a side view of the apparatus shown in FIG. 1.
Figure 3:
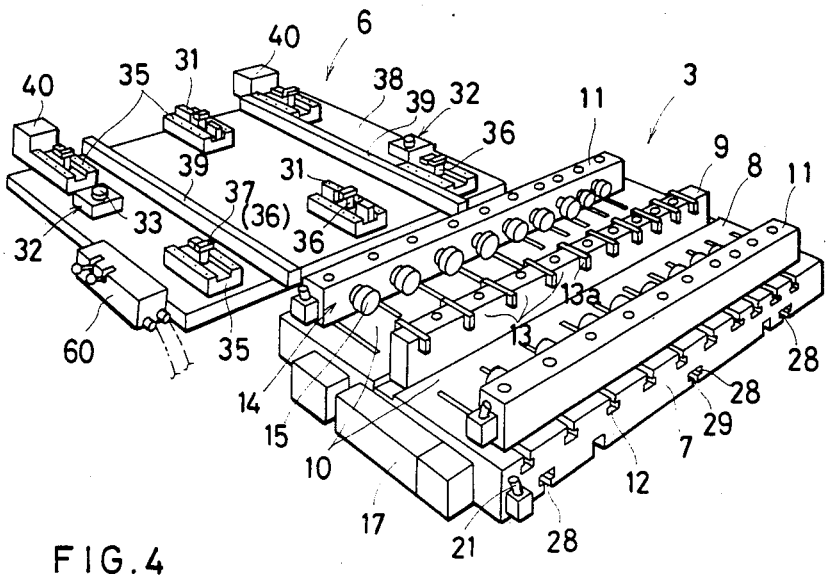
FIG. 3 is a perspective view of a pallet clamping device and a work-clamp pallet according to the invention.
Figure 4:
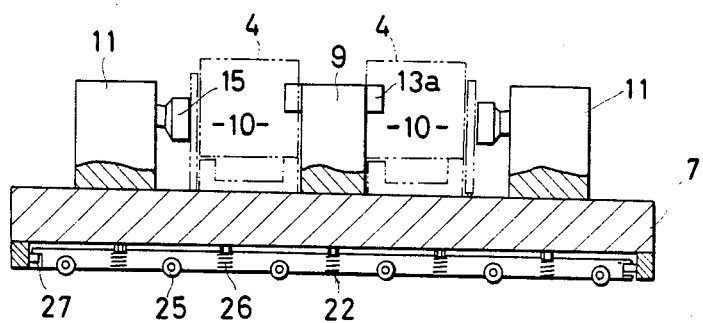
FIG. 4 is a partial vertical sectional side view of the work-clamp pallet shown in FIG. 3.

As shown in FIG. 3, work clamp pallet 3 has attached thereto a standard frame 9 extending along the lateral center of a work-clamping face on the topside of the pallet's base block 7. On both longitudinal sides of the standard frame 9 are arranged clamping frames 11 which, with base block 7, define work accommodating spaces 10.

Each clamping frame 11 is provided with a plurality of work-clamping devices 14 opposite a plurality of workpiece positioning faces 13 on the front and rear sides of the standard frame 9. Workpiece 4 is clamped or unclamped as each clamping block 15 is driven toward or away from each workpiece positioning face 13. Workpiece-positioning members 13a are removably attached in mating grooves in the topside of the standard frame 9.

Figure 14:
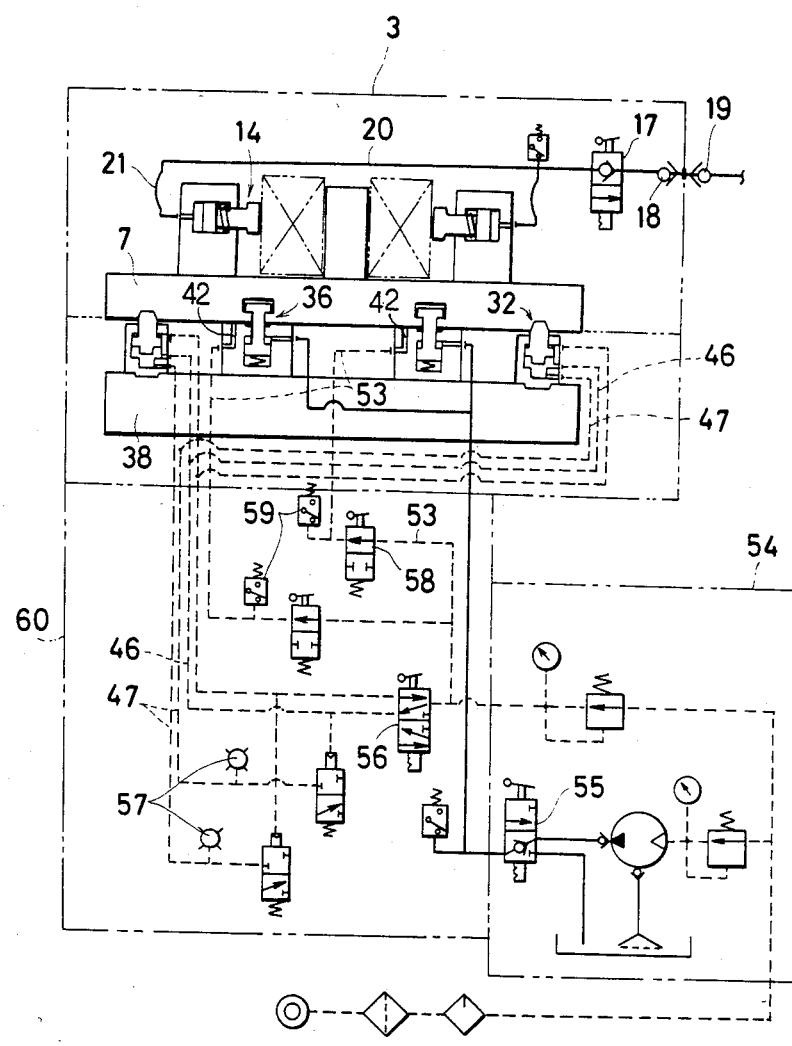
FIG. 14 is a schematic diagram showing the pneumatic-hydraulic system according to the invention.
Figure 24:
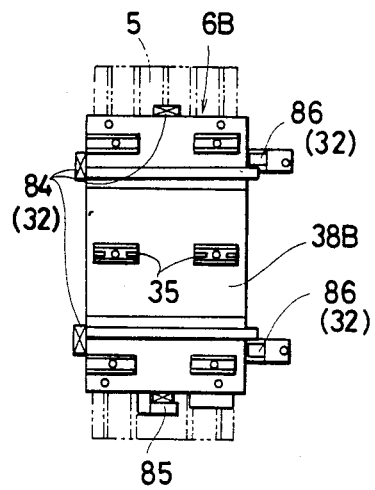
FIG. 24 is a plan view of a third embodiment of the pallet clamping device.

As shown in FIGS. 11 and 14, the clamping drive means of the work-clamping device 14 is a hydraulic cylinder 16 in the clamping frame 11. Hydraulic oil is supplied from a hydraulic pressure supply device (not shown) connected to a hydraulic pressure inlet/outlet 18 of a shut-off valve 17, through the shut-off valve 17, through an oil path 20 in the base block 7, a hydraulic hose 21 and another oil path 20 in the clamping frame 11.

After clamping the workpieces 4, the oil path 20 is shut down by the shut-off valve 17, and the oil pressure outlet 19 is disconnected from the oil pressure inlet/outlet 18. In this state the work-clamp pallet 3 can be transferred to the machine tool and the workpieces 4 clamped thereon can be machined. The shut-off valve 17 is the same as that shown in the first alternative embodiment.

Castor-type transfer means 22 are provided on the pallet 3 in square-sectioned grooves 23 in the underside of the base block 7. Normally, a U-sectioned member 24 carrying castors 25 is urged downwardly by compression springs 26 such that the tread of each castor 25 is projected beyond the underside of the base block 7 so that the work-clamp pallet 3 is movable on the castors 25 rolling on the transfer rails 39 and 39A. When the work-clamp pallet 3 is pulled down by the clamping devices 36, the U-sectioned member 24 is displaced against the springs 26. Reference numeral 27 denotes a retainer preventing the U-sectioned member 24 from falling out.

Each U-sectioned member 24 is provided with a plurality of castors 25 so that the work-clamp pallet 3 is smoothly movable even if there is a gap between the pallet-changing table 2 and the pallet clamping device 6.

The vertical sides of the longitudinal center T-sectioned groove in the underside of the base block 7 constitute transfer guide faces 29 to guide the work-clamp pallet 3 and prevent lateral shifting. In this T-sectioned groove, a guide rail 30 on the pallet-changing table 2 and/or a guide rail 31 on the pallet clamping device 6 are engaged so as to be freely slidable therein for the work-clamp pallet 3 to be longitudinally guided.

Further, there are provided a pair of positioning or locating means 34 in the underside of the base plate 7 for engagement with plugs 33 of positioning devices 32 of the pallet clamping device.

Three longitudinal T-sectioned grooves 28 are provided on the left and right and at the center on the underside of the base block 7 to clamp the base block 7 onto supporting blocks 35 via interengagement with clamp means 36.

As the work-clamp pallet 3 is transferred to or from pallet clamping device 6, clamping arms 37 are slidably engaged in the clamping grooves 28 to allow moving of the work-clamp pallet 3. When the work-clamp pallet 3 is to be clamped, the clamping arms 37 are lowered into the clamping position so as to clamp base block 7 to the supporting blocks 35.

The pallet clamping device 6 provided on the work table 5 of the machine tool 1 is, as shown in FIG. 3, composed of a bed plate 38, a lateral pair of transfer rails 39 and center guide rails 31 set on the topside of the base plate 38. The device also has supporting blocks 35, a pair of positioning devices 32, a plurality of clamping devices 36 and stops 40.

In this embodiment, the base plate 38 is made of steel plate separate from the work table 5 and is removably secured to the work table 5 by means of bolts 41. This allows the apparatus of the invention to be readily applicable to standard machine tools 1.

Of course, it is also possible to form this base plate 38 with the work table 5, but the universal feature of the machine tool 1 is then affected.

Figure 5:
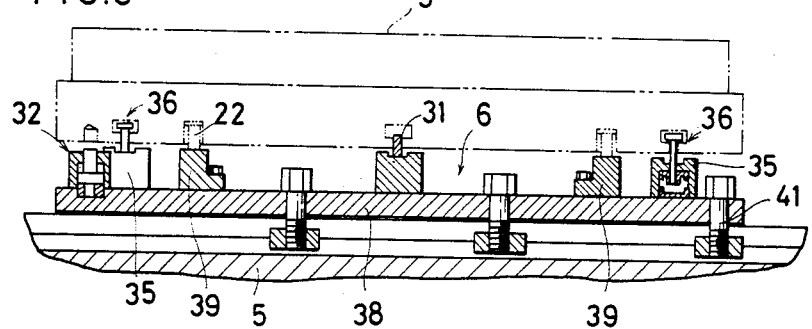
FIG. 5 is a partial vertical sectional view taken along the line V—V in FIG. 1.
Figure 6:
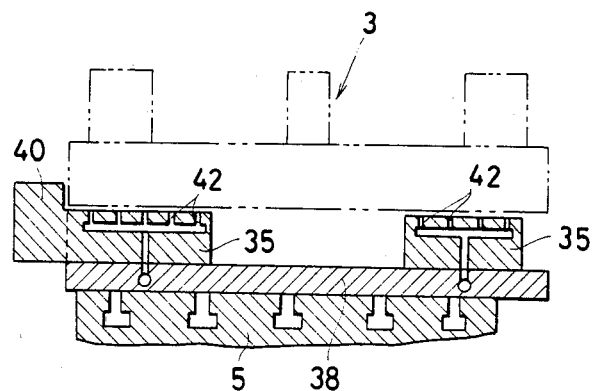
FIG. 6 is a partial vertical sectional view taken along the line VI—VI in FIG. 1.
Figure 7:
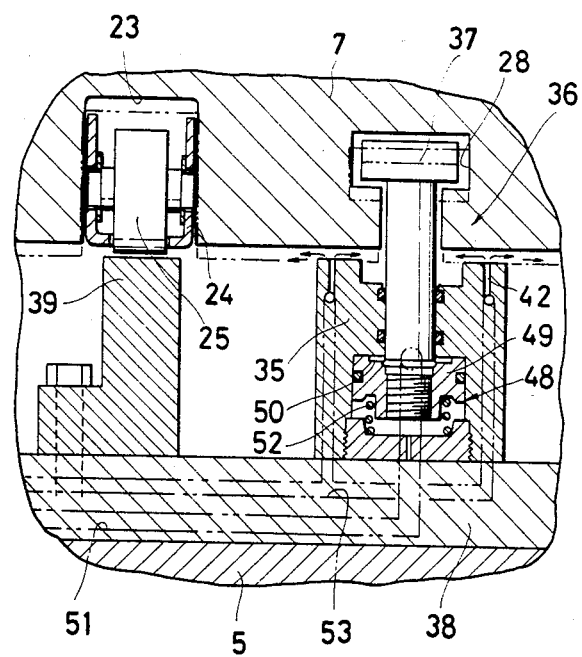
FIG. 7 is a partial vertical sectional front view showing the castor transfer means and the clamping devices according to the invention.
Figure 8:
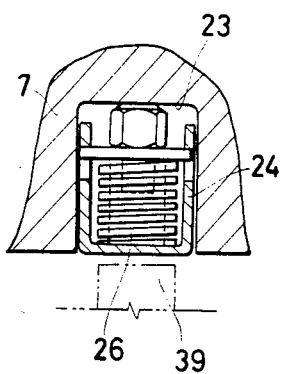
FIG. 8 is a partial vertical sectional front view of a spring portion of the castor transfer means of the work-clamp pallet.

As shown in FIGS. 3, 5 and 7, the transfer rails 39 are set on the upper surface of the base plate 38 one each on the left and right to correspond to the location of transfer means 22 on the work-clamp pallet 3. Transfer rails 39 are made of L-sectioned members and are secured to the base plate 38 by means of bolts or the like.

Transfer rails 39 have a narrow top track face which is disposed above the topside of the base plate 38, hence chips are not easily deposited on it and, if deposited, they can be removed easily. If necessary, scrapers (not shown) may be provided at the front and rear ends of the transfer means 22 for automatic cleaning of the track face.

It is advisable to have the transfer rails 39 narrower than the square-sectioned groove 23 of the transfer means 22 to prevent chips from being caught between the transfer rails 39 and the base block 7.

As shown in FIGS. 12 and 13, it is also practical to form the transfer rails 39A and 39B, and the castors 25 also serve as the guiding means.

As shown in FIGS. 3 and 10, guide rails 31 are located on each of the center pallet supporting blocks 35 aligned longitudinally, and extend above the horizontal reference plane on pallet supporting surface defined by the topside of each supporting block 35. This guide rail 31 comes into sliding contact with the transfer guide face 29 as the work-clamp pallet 3 is transferred to or from the pallet clamping device 6.

It is advisable to round the front end of foremost guide rail 31 so that it can be engaged smoothly by the mating groove in the underside of the base block 7. The guide rails 31 may as well be formed as a continuous, longitudinal member.

In an alternative embodiment the guide rails 31 may be provided along both left and right edges of the base plate 38 so as to be in sliding contact with the transfer guide faces 29 on the left and right sides of the work-clamp pallet 3.

The supporting blocks 35 may by located in 3 longitudinal pairs on the left and right sides and at the center of the bed plate 38. Their upper surfaces define a horizontal reference plane and pallet supporting surface located higher than the upper surface of the bed plate 38.

Each supporting block 35 is recessed about its center in the form of a shallow groove to make its top supporting face as small as possible to minimize the risk of chips depositing thereon and it is so arranged, as will be described later in greater detail, that the foreign objects which may possibly be deposited on each supporting block 35 are blown off by the compressed air jetted out of air outlets 42. At the rear end of the rearmost supporting block 35 there is formed a projecting stop 40 to locate the work-clamp pallet 3 in its approximate position.

As shown in FIGS. 3 and 9, the positioning device 32 is a plug means 33 consisting of air cylinders arranged on the base 38 near the left and right sides. The piston rod of each air cylinder, whose upper end portion constitutes the plug 33, is arranged to be shiftable between a locating position in which the plug 33 is projected above the pallet supporting surface and a waiting position with the plug 33 retracted.

With the work-clamp pallet 3 stopped at a predetermined position, the plug 33 is shifted from the waiting position to the locating position so as to be engaged in the positioning means 34 of the base block 7 for highly precise positioning of the base block 7.

As shown in FIG. 9, a stop valve 45 attached to piston 44 of the air cylinder is provided between an air supply channel 46 an a pneumatic pressure detection channel 47. The stop valve 45 is closed when the piston 44 is at the waiting position and opened when it is at the locating position. The air pressure in channel 47 may be used to provide an indication of the position of piston 44.

Clamping means 36 is disposed at the center of each pallet supporting block 35 and has clamping arm 37 connected to a piston 49 of a hydraulic cylinder 48 formed in the supporting block 35. Clamping arm 37 projects from the supporting block 35 above the horizontal reference plane so as to slidably engage the clamping grooves 28 of the work-clamp pallet 3.

When hydraulic oil is supplied via oil path 51 to hydraulic oil chamber 50 of the hydraulic cylinder 48, the clamping arm 37 is shifted from the extended, unclamping position to the clamping position to clamp the base block 7 to the supporting blocks 35.

When hydraulic oil is drained, the clamping arm 37 is shifted to the unclamping position by a spring 52.

The pallet supporting blocks 35 are arranged close by each clamping arm 37 on both left and right sides thereof to prevent deformation of groove 28 by the clamping force.

In order to prevent chips or debris from being caught between each supporting block 35 and the base block 7, air outlets 42 are arranged in the pallet supporting surface of the pallet supporting blocks 35. Compressed air from an air supply channel 53 in the bed plate 38 exits through outlets 42 to dislodge any chips deposited on the supporting block 35 as shown in FIGS. 7 and 10.

When the base block 7 is clamped on the pallet supporting blocks 35, the pneumatic pressure in the air supply channel 53 rises. Hence, clamping of the base block 7 on all pallet supporting blocks 35 in gap-free contact therewith can be confirmed through detection of this rise in pneumatic pressure.

FIG. 14, shows the pneumatic-hydraulic pressure system of the positioning device 32 and the clamping device 36.

The hydraulic pressure generated by a hydraulic pressure supply device 54 of the machine tool 1 or the pallet-changing table 2 is supplied to the clamping device 36 through a shut-off valve of the direction switching type 55.

When the air supply channel 46 is switched by a direction switching valve 56, compressed air is supplied to the locating means 32 for the plug 33 to be extended. This opens stop valve 45 to the pneumatic pressure detection channel 47 and the condition is displayed by a pneumatic pressure indicator lamp 57. By this indication, proper actuation of the positioning device 32 can be confirmed.

Further, compressed air is supplied to the air supply channel 53 with a switching valve 58 switched accordingly for it to be jetted out through the air outlets 42 in the topside of the supporting block 35.

When the base block 7 is clamped, the air outlets 42 are closed and the pneumatic pressure in the air supply channel 53 rises. A pressure switch 59 is provided for detection of this rise of pneumatic pressure. Secure clamping of the base block 7 can thus be confirmed.

A valve unit 60 with the switching valves 56 and 58, pneumatic pressure indicator lamp 57, pressure switch 59 etc. incorporated in it is attached to one side of the base plate 38 (FIG. 3).

A first alternative embodiment is shown in FIGS. 15~23.

During machining of the workpieces 4 on work-clamp pallet 3, it is necessary to keep the clamping devices 36 actuated but, as the movable table 5 of a machine tool 1 moves over a substantial distance, it is desired to have the hydraulic hoses detached during machining operation.

Hence, in this pallet clamping device 6A a shut-off valve 61 is provided for opening and closing the oil path 51 leading to the hydraulic oil chamber 50 of the clamping device 36. Inlet 62 of valve 61, provided on bed plate 38A is connected to a hydraulic pressure outlet 63 of a hydraulic pressure supply device (not shown) by a disconnectable, self-sealing coupling.

The air supply channel 46, and pneumatic pressure detection channel 47 are also arranged to be disconnectably connected with pneumatic hoses by self-seal couplings. In the base plate 38A there is provided a spring-type hydraulic accumulator 64 with pressure accumulating oil chamber 65 communicating with the hydraulic cylinder 48.

When the work-clamp pallet 3 is replaced and the new pallet is positioned and clamped, the couplings of the hydraulic and pneumatic hoses are connected, and disconnected after clamping of the work-clamp pallet 3. The hydraulic pressures in the clamping devices 36 and the spring-type accumulator 64 then remain perfectly retained by the shut-off valve 61, i.e. by a check valve incorporated therein.

The hydraulic pressure thus retained is kept substantially constant by means of the accumulator 64 even in the event of variation of oil temperature or hydraulic pressure leakage.

As shown by the dotted line in FIG. 17, the united body of base block 7 and bed plate 38A is subjected to a bending moment resulting from the clamping force of the work-clamping devices 14. The deformation may be a maximum of approx. 50~500 microns.

In order to prevent this deformation, an oil chamber 66 extends laterally approximately over the length of the bed plate 38A and communicates with the oil path 51.

As shown, the hydraulic pressure of the hydraulic oil in chamber 66 acts longitudinally on the bed plate 38A and subjects the structure to an inverse bending moment cancelling or offsetting the abovementioned bending moment. N.A. in the figure indicates the neutral axis of the abovementioned united body.

For enhancing the stretching of the bed plate 38A, it is advisable to provide 3~4 oil rooms 66 parallel to one another spaced longitudinally rather than one.

It is, however, also possible to provide an oil chamber 66A in the base block 7 beneath the neutral axis as shown in FIG. 18 for an inverse bending moment to be generated inside base block 7A.

When deformation of the base block 7A is prevented as mentioned above, the base block 7A of the work-clamp pallet 3 as well as the bed plate 38A can be made thinner and lighter in addition to improving the machining precision of the workpieces by eliminating adverse influences on the work table 5.

FIGS. 19~22 show the shut-off valve 61 for opening/closing the oil path 51 and an actuator 67 for detecting the decline of hydraulic pressure.

Hydraulic oil is supplied from the hydraulic pressure inlet/outlet 62 through a primary port 68, valve chamber 69 and secondary port 70 to the oil path 51 and thence to each clamping device 36. For unclamping, a manipulating handle 71 is shifted to turn a cam shaft 72 approx. 60° and thereupon a valve opening rod 74 is caused by inclined cam face 73 to push a valve core 75 to open the valve.

In this shut-off valve 61 the valve core's seating face is formed as a synthetic resin ring 76 and valve seat 77 as an annular protrusion, hence hydraulic oi is perfectly shut down. Reference numeral 78 denotes a stop valve for releasing hydraulic pressure.

In the event of a decline in hydraulic pressure in the oil path 51, hydraulic pressure detector 67 activates a limit switch 79 on the work table 5 to indicate this the condition.

Reference numeral 80 denotes a rotation limiter and 81 a locking means.

The spring-type hydraulic accumulator 64 shown in FIG. 23 is provided in the bed plate 38A with an oil chamber 65 connected to the oil path 51 of the clamping device 36.

When hydraulic pressure starts its decline, a piston 82 is advanced by the force of a spring 83 to maintain the pressure in the clamping devices. If the pressure starts rising due to rise of the oil temperature, the piston 82 retracts, thereby precluding abnormal fluctuation of hydraulic pressure.

For a more detailed exploration of the hydraulic system and associated structure, reference is made to U.S. Ser. No. 383,696 to Kitawra et al. filed on June 1, 1982 now abandoned and entitled "Work Exchanging Apparatus for Machine Tools".

In the alternative embodiment shown in FIGS. 24-27, the positioning device 32 of pallet-clamping device 6B comprises stop means 84 located at the rear and at one end of the a bed plate 38B, and movable pawl means 85 and 86 located at the front end and an opposite end thereof.

The movable pawl means 86 on the front side consists of a movable pawl 87 connected to a piston of an air cylinder arranged to be shiftable between a locating position and a retracted position. When, the air cylinder is operated to advance the movable pawl 87, the movable pawl 87 is pushed up by a spring 88 as it advances to come into contact with a positioning or locating means 34A disposed under the front edge of the base block 7 for the work-clamp pallet 3.

Figure 25:
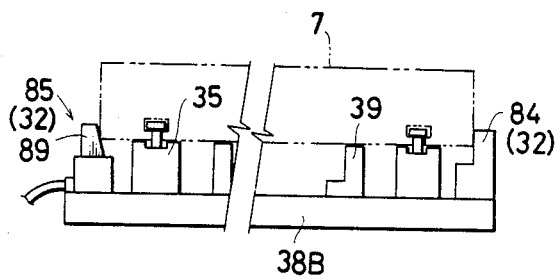
FIG. 25 is a front view of the pallet clamping device shown in FIG. 24.
Figure 26:
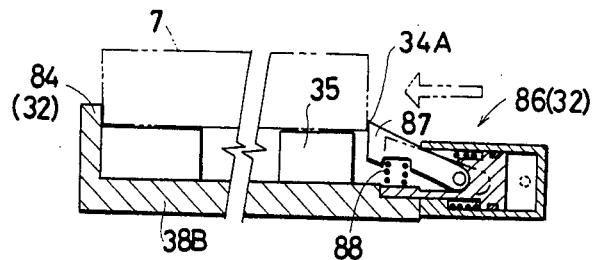
FIG. 26 is a partial vertial sectional side view of the pallet clamping device and a positioning device according to the embodiment shown in FIG. 24.
Figure 28:
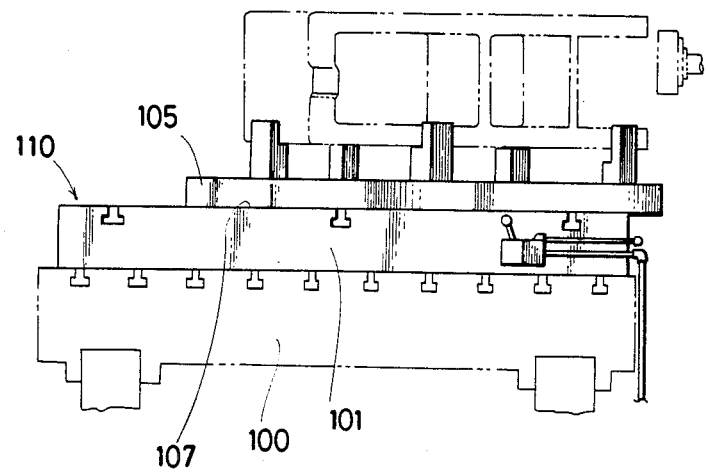
FIG. 28 is a side view of a locating and clamping apparatus according to the prior art and a work member supporting fixture clamped thereon.
Figure 29:
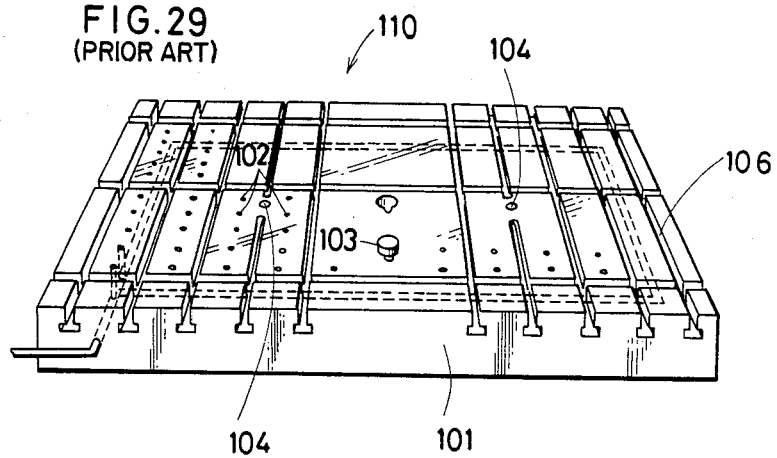
FIG. 29 is a perspective view of the prior art locating and clamping apparatus shown in FIG. 28.

The movable pawl means 85 at one end of the bed plate 38B consists of an air cylinder with a movable pawl 89 having an inclined cam face formed in the upper end portion of its piston rod. When the movable pawl 89 is pushed up, the base block 7 is pushed to the right (as seen in FIG. 25) to position the work-clamp pallet 3 laterally.

Figure 27:
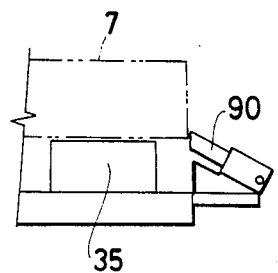
FIG. 27 is a partial side view of the pallet-clamping device showing a modified movable pawl means of the positioning device.

Alternatively, as shown in FIG. 27, an inclined hydraulic or air cylinder may be the movable pawl means for the base block 7 to be pushed by a movable pawl 90 consisting of its piston rod.

We claim:
1. In a system wherein a pallet having at least one workpiece removably clamped thereon is removably clamped to a worktable of a machine tool which performs a machining operation on the workpiece, the improved device for removably clamping the pallet to the machine worktable comprising:
  (a) a bed plate attached to the machine worktable;
  (b) a plurality of pallet supporting blocks attached to an upper surface of the bed plate at spaced apart locations, each pallet support block defining an upper pallet supporting surface;
  (c) a plurality of transfer rails attached to the upper surface of the bed plate and extending in generally parallel directions;
  (d) a plurality of spring biased castor means attached to the pallet in a plurality of grooves formed in the underside of the pallet, the grooves extending generally parallel to the transfer rails, the castor means being movable between extended and retracted positions and located such that, in their extended position, they roll along the transfer rails to facilitate the transfer of the pallet between the worktable and a pallet changing table, each of the castor means comprising:

(i) an elongated U-shaped member slidably retained in each of the grooves;

(ii) coil spring biasing means interposed between the U-shaped member and the pallet so as to bias the U-shaped member to its extended position; and, (iii) a plurality of castors rotatably attached to each U-shaped member;

(e) a pair of stops attached to the bed plate such that they contact an edge of the pallet to position the pallet in a direction parallel to the transfer rails;

(f) a positioning device attached to the bed plate so as to accurately position the pallet on the bed plate;

(g) clamp means contained within each pallet supporting block and engaging the pallet so as to clamp the pallet to the pallet supporting blocks so as to overcome the force of the spring bias and move the castor means to their retracted position such that a lower surface of the pallet contacts the pallet supporting surfaces of the pallet supporting blocks thereby supporting the pallet a predetermined distance above the bed plate, the clamp means comprising:

(i) a clamping chamber defined by the pallet supporting block;

(ii) a clamping piston slidably movable in the chamber;

(iii) a clamping arm attached to the clamping piston and extending exteriorly of the pallet supporting blocks through pallet supporting surface, the distal end of the clamping arm engaging a slot defined by the pallet; and, (iv) passage means defined by the bed plate to supply a pressurized fluid to the chamber to cause the clamping piston and the clamping arm to move in a generally vertical direction so as to clamp and unclamp the pallet; and, (h) a source of pressurized hydraulic fluid to supply hydraulic fluid to the clamping chambers.

2. The improved pallet clamping device of claim 1 wherein the distal end of the clamping arm and the corresponding slot defined by the pallet have "T" shaped cross-sections.

3. The improved pallet clamping device of claim 2 wherein the pressurized fluid is an hydraulic fluid.

4. The improved pallet clamping device of claim 3 further comprising:

(a) a plurality of passages defined by the pallet supporting blocks, the passages having outlets on the pallet supporting surface; and, (b) means to supply pressurized air to the passages such that the pressurized air exits through the outlets and, when deflected by the pallet, removes debris from the pallet supporting surface.

5. The improved pallet clamping device of claim 4 wherein the pallet defines a guide slot and further comprising a guide rail attached to at least one pallet supporting block so as to engage the guide slot.

6. The improved pallet clamping device of claim 4 further comprising pressure switch means in the pressurized air supply means to shut off the supply of pressurized air to the passages when the pressure reaches a predetermined level.

7. The improved pallet clamping device of claim 1 wherein the hydraulic accumulator means comprises:

(a) at least one hydraulic accumulator chamber defined by the bed plate;

(b) passage means connecting the accumulator chamber to the hydraulic fluid source and to the clamping chambers of the pallet supporting blocks;

(c) a piston slidably disposed in the accumulator chamber; and, (d) spring means biasing the piston toward one end of the accumulator chamber.

8. The improved pallet clamping device of claim 7 further comprising:

(a) a second chamber defined by the bed plate; and, (b) means to introduce pressurized hydraulic fluid into the second chamber so as to increase the bending resistance of the bed plate when a pallet is clamped thereon.

9. The improved pallet clamping device of claim 1 further comprising:

(a) fixed stop means attached to a rear portion and one lateral side of the bed plate to locate the pallet with respect to the bed plate;

(b) first pneumatically actuated pawl means which bears against a front portion of the pallet so as to force it against the fixed stop located at the rear portion of the bed plate; and, (c) second pneumatically actuated pawl means which bears against a second lateral side of the pallet to force it against the fixed stop located at the one lateral side of the bed plate.

* * * * *